US008837398B2

(12) United States Patent
Yuan et al.

(10) Patent No.: US 8,837,398 B2
(45) Date of Patent: Sep. 16, 2014

(54) GENERATING TRANSMISSION SCHEDULES

(75) Inventors: Yuan Yuan, Sunnyvale, CA (US); C. Philip Gossett, Mountain View, CA (US); Alex Gaysinsky, Albany, CA (US)

(73) Assignee: Google Inc., Mountain View, CA (US)

(*) Notice: Subject to any disclaimer, the term of this patent is extended or adjusted under 35 U.S.C. 154(b) by 156 days.

(21) Appl. No.: 13/286,810

(22) Filed: Nov. 1, 2011

(65) Prior Publication Data
US 2013/0107817 A1    May 2, 2013

(51) Int. Cl.
| | |
|---|---|
| H04W 4/00 | (2009.01) |
| H04W 72/12 | (2009.01) |
| H04L 12/56 | (2006.01) |
| H04L 12/28 | (2006.01) |
| H04W 72/00 | (2009.01) |
| H04W 28/06 | (2009.01) |
| H04W 84/18 | (2009.01) |
| H04W 72/04 | (2009.01) |

(52) U.S. Cl.
CPC .......... *H04W 72/1289* (2013.01); *H04W 28/06* (2013.01); *H04W 84/18* (2013.01); *H04W 72/04* (2013.01)
USPC ...... 370/329; 370/394; 370/395.4; 455/452.1

(58) Field of Classification Search
USPC ............ 370/328–330, 341–350, 394, 395.21, 370/395.4, 395.41, 395.42; 455/452.1
See application file for complete search history.

(56) References Cited

U.S. PATENT DOCUMENTS

| | | | |
|---|---|---|---|
| 2004/0100929 A1* | 5/2004 | Garcia-Luna-Aceves | .... 370/338 |
| 2005/0053035 A1 | 3/2005 | Kwak et al. | |
| 2005/0254459 A1* | 11/2005 | Qian | .............................. 370/328 |
| 2007/0097867 A1 | 5/2007 | Kneckt et al. | |
| 2007/0237081 A1 | 10/2007 | Kodialam et al. | |
| 2007/0248048 A1* | 10/2007 | Zhu et al. | ....................... 370/329 |
| 2008/0005219 A1 | 1/2008 | Nabar et al. | |
| 2008/0095123 A1 | 4/2008 | Kuroda et al. | |
| 2008/0151928 A1 | 6/2008 | Mosko et al. | |
| 2009/0080375 A1* | 3/2009 | Jalil et al. | ....................... 370/329 |

FOREIGN PATENT DOCUMENTS

EP    1 643 690    4/2006

OTHER PUBLICATIONS

Sadeghi, B., V. Kanodia, A. Sabharwal, and E. Knightly. "OAR: An Opportunistic Auto-rate Media Access Protocol for Ad Hoc Networks." Department of Electrical and Computer Engineering, Rice University; Houston, TX; 2005 (15 pages).

(Continued)

*Primary Examiner* — Xavier Szewai Wong
(74) *Attorney, Agent, or Firm* — Fish & Richardson P.C.

(57) ABSTRACT

In general, the subject matter described in this specification can be embodied in methods, systems, and program products for generating a schedule to transmit data on a network. The method includes accessing information that identifies a quantity of data that a particular client device has designated for transmission. The method includes determining, using the information that identifies the quantity of data for each of multiple client devices, a first schedule that identifies a subset of packet time segments, from a frame that includes packet time segments, during which a first client device is permitted to transmit data to the computing system. The first client device is one of the multiple client devices. The information includes transmitting the first schedule. The schedule includes receiving a transmission of data from the first client device during the identified subset of packet time segments in accordance with the schedule.

22 Claims, 7 Drawing Sheets

(56) References Cited

OTHER PUBLICATIONS

International Search Report and Written Opinion in International Application No. PCT/US2012/059025, mailed May 21, 2013, 11 pages.

Tsai et al., "Introduction to Packet Scheduling Algorithms for Communication Networks," Communications & Networking, Sep. 2010, pp. 263-288.

* cited by examiner

GENERATING TRANSMISSION SCHEDULES

TECHNICAL FIELD

This document generally relates to network communication.

BACKGROUND

Modern wireless data communication systems provide bandwidth for use by rich computing applications on mobile devices. For example, users of wireless mobile devices such as smart phones can make telephone calls, receive emails, and even receive full-motion audio/video broadcasts on their mobile devices. Every time a great new service is offered, users of mobile devices consume data associated with the service, requiring more and more bandwidth. As a result, the airwaves are filled with data going to and from an increasing number of mobile computing devices that each requires growing amounts of data.

The rate at which a mobile device transmits data can vary over time. For example, while mobile devices that transmit a stream of audio may transmit a similar level of data during each frame and for an extended series of frames, devices can occasionally send requests for web pages in bursts. The electromagnetic spectrum that mobile devices use for wireless communication is treated as a precious resource. As such, various mechanisms are used to maximize the data that a network of wireless devices and corresponding base stations can exchange in a particular portion of spectrum.

SUMMARY

A wireless communication system can include wireless computing devices that wirelessly communicate data with a base station. Each client device may queue data for transmission to the base station, and may transmit the queued data during a permitted portion of a repeating time period that is referred to as a frame. Each client device may transmit, to the base station during each frame, each device's queue size. The base station may use the received queue sizes to generate a schedule for each client device, where each schedule defines a permitted portion of a frame during which the respective client device may transmit data to the base station. The base station may transmit the schedules to the client devices.

As additional description to the implementations described below, the present disclosure describes the following implementations:

Implementation 1 is a computer-implemented method for generating a schedule to transmit data on a network. The method includes receiving, by a computing system and for each particular client device of multiple client devices from a plurality of client devices with which the computing system is communicating in a network, information that identifies a quantity of data that the particular client device has designated for transmission to the computing system. The method includes identifying, by the computing system, an initial allocation of packet time segments, from a frame that includes packet time segments, among the multiple client devices. The method includes determining, by the computing system, as available packet time segments, those packet time segments of the initially allocated packet time segments that one or more of the multiple client devices would not use in order for each of the one or more of the multiple client devices to transmit the data that the respective client device has designated for transmission to the computing system. The method includes allocating, by the computing system, the available packet time segments among a subset of the multiple client devices proportionally based on a quantity of data that each of the subset of client devices has designated for transmission to the computing system, in order to generate a final allocation of packet time segments among the multiple client devices, the subset of the multiple client devices being those client devices of the multiple client devices that are not the one or more client devices. The method includes transmitting, by the computing system and for receipt by each particular client device of the multiple client devices, a schedule that identifies a subset of packet time segments from the frame during which the particular client device is permitted to transmit data to the computing system, the subset of packet time segments for each particular client device being identified from the final allocation of packet time segments.

Implementation 2 is a computer-implemented method for generating a schedule to transmit data on a network. The method includes accessing, by a computing system and for each particular client device of multiple client devices from a plurality of client devices with which the computing system is communicating in a network, information that identifies a quantity of data that the particular client device has designated for transmission to the computing system. The method includes determining, by the computing system and using the information that identifies the quantity of data for each of the multiple client devices, a first schedule that identifies a subset of packet time segments, from a frame that includes packet time segments, during which a first client device is permitted to transmit data to the computing system, the first client device being one of the multiple client devices. The method includes transmitting, by the computing system, the first schedule for receipt by the first client device. The method includes receiving, by the computing system, a transmission of data from the first client device during the identified subset of packet time segments in accordance with the schedule.

Implementation 3 is related to the method of implementation 2. The method further includes receiving, by the computing system and from each particular client device of the multiple client devices, a transmission of data from the particular client device that includes the information that identifies the quantity of data that the particular client device has designated for transmission to the computing system.

Implementation 4 is related to the method of any one of implementations 2-3, wherein the information that identifies the quantity of data is a quantity of bytes or bits that the particular client device has designated for transmission to the computing system.

Implementation 5 is related to the method of any one of implementations 2-3, wherein the information that identifies the quantity of data is a quantity of packets that the particular client device would use to transmit, to the computing system, the data that the particular client device has designated for transmission to the computing system.

Implementation 6 is related to the method of any one of implementations 2-5, wherein determining the first schedule includes proportionally allocating at least some of the packet time segments from the frame among at least some of the client devices, the proportional allocation of the at least some packet time segments being based on the quantity of data that the at least some client devices have designated for transmission to the computing system.

Implementation 7 is related to the method of any one of implementations 2-5, wherein determining the first schedule includes: identifying, by the computing system, an initial allocation of the packet time segments among the multiple client devices; determining, by the computing system, as available packet time segments, those packet time segments of the initially allocated packet time segments that one or more of the client devices would not use in order for each of the one or more of the client devices to transmit the data that the respective client device has designated for transmission to the computing system; and allocating, by the computing system, the available packet time segments among a subset of the client devices including those client devices of the multiple client devices that are not the one or more client devices.

Implementation 8 is related to the method of implementation 7, wherein the available packet time segments are proportionally allocated among the subset of the client devices based on a weight value that has been assigned to each of the subset of client devices, the weight value being different between at least two of the subset of client devices.

Implementation 9 is related to the method of implementation 7, wherein the available packet time segments are proportionally allocated among the subset of the client devices based on an amount of data that each of the subset of client devices has designated for transmission to the computing system.

Implementation 10 is related to the method of implementation 7, wherein the available packet time segments are proportionally allocated among the subset of client devices proportionally based on an amount of data that each of the subset of client devices would not be able to transmit in a single frame using the initial allocation of packet time segments.

Implementation 11 is related to the method of implementation 7. The method further includes determining the initial allocation of the packet time segments by allocating an equal amount of the packet time segments in the frame to each of the multiple client devices.

Implementation 12 is related to the method of implementation 7. The method further includes determining the initial allocation of the packet time segments by allocating the packet time segments in the frame proportionally among the multiple client devices according to a weight value for each of the multiple client devices. The weight value for each particular client device of the multiple client devices is based, at least in part, on a priority value of data that the particular client device has designated for transmission to the computing system, the priority value identifying a degree of time-criticality of the data that the particular client device has designated for transmission to the computing system.

Implementation 13 is related to the method of implementation 7. The method further includes determining the initial allocation of the packet time segments by proportionally allocating the packet time segments in the frame among the multiple client devices according to a weight value. The weight value for each particular client device of the multiple client devices is based, at least in part, on a data rate at which the particular client device is transmitting data to the computing system, the data rate being different between at least two of the multiple client devices.

Implementation 14 is related to the method of implementation 13, wherein the computing system initially allocates more packet time segments to a first client device of the multiple client devices than a second client device of the multiple client devices based on the first client device being associated with a greater weight value than a weight value of the second client device, the first client device having a greater weight value than the second client device based on the first client device transmitting at a higher data rate than the second client device.

Implementation 15 is related to the method of any one of implementations 2-14, wherein: the computing system transmits the first schedule to the first client device during a first frame that includes packet time segments; during the first frame, the first client device does not transmit data in accordance with the first schedule; and the received transmission of data from the first client device occurs during a second frame that is subsequent to the first frame.

Implementation 16 is related to the method of any one of implementations 2-15, wherein the subset of packet time segments are a set of contiguous packet time segments in the frame.

Implementation 17 is related to the method of implementation 16. The method further includes determining a position of the subset of packet time segments in the frame, with respect to other subsets of packet time segments for other of the multiple client devices, based a conservation value that is associated with each of the client devices, wherein the conservation value for each of at least some of the client devices indicates a power efficiency setting that is associated with the respective client device.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

Implementation 18 is a system comprising a computing system. The computing system includes a data repository that stores, for each particular client device of multiple client devices, information that identifies a quantity of data that the particular client device has designated for transmission. The computing system includes a computing sub-system that is configured to use information that identifies the quantity of data for each of the multiple client devices to generate a schedule that identifies a subset of packet time segments, from a frame of packet time segments, during which a first client device is permitted to transmit data, the first client device being one of the multiple client devices. The computing system includes a data transmitter that is configured to transmit the schedule for receipt by the client device.

Implementation 19 is related to the system of implementation 18, wherein the schedule grant generator is further configured to proportionally allocate packet time segments from a frame of packet time segments among multiple client devices based on the information that identifies the quantity of data for each of the multiple client devices.

Implementation 20 is related to the system of implementation 19. The system further includes the first client device, wherein the first client device includes a data transmitter that is configured to: receive the schedule; transmit, in a single frame of packet time segments and during the subset of packet time segments that are identified by the schedule, at least a portion of the quantity of data that the first device designated for transmission; and transmit, in the single frame, an indication of a quantity of data that remains designated by the particular client device for transmission after transmission by the particular client device of the at least portion of the quantity of data.

Particular embodiments can be implemented, in certain instances, to realize one or more of the following advantages. Wireless communication system use of electromagnetic spectrum may be increased—i.e. could be expanded beyond what is possible without using the approaches discussed here. Further, devices that transmit at a higher data rate, and devices that transmit time-critical data, may be prioritized and assigned more time to transmit over the spectrum than other devices. Moreover, devices that have queued a large amount of data may be assigned more time to transmit over the spectrum than devices that have queued a small amount of data, so as to decrease the time to transmit the large queues of data. As a result, devices can be serviced by a network to a degree that is aimed at the needs of the particular devices.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
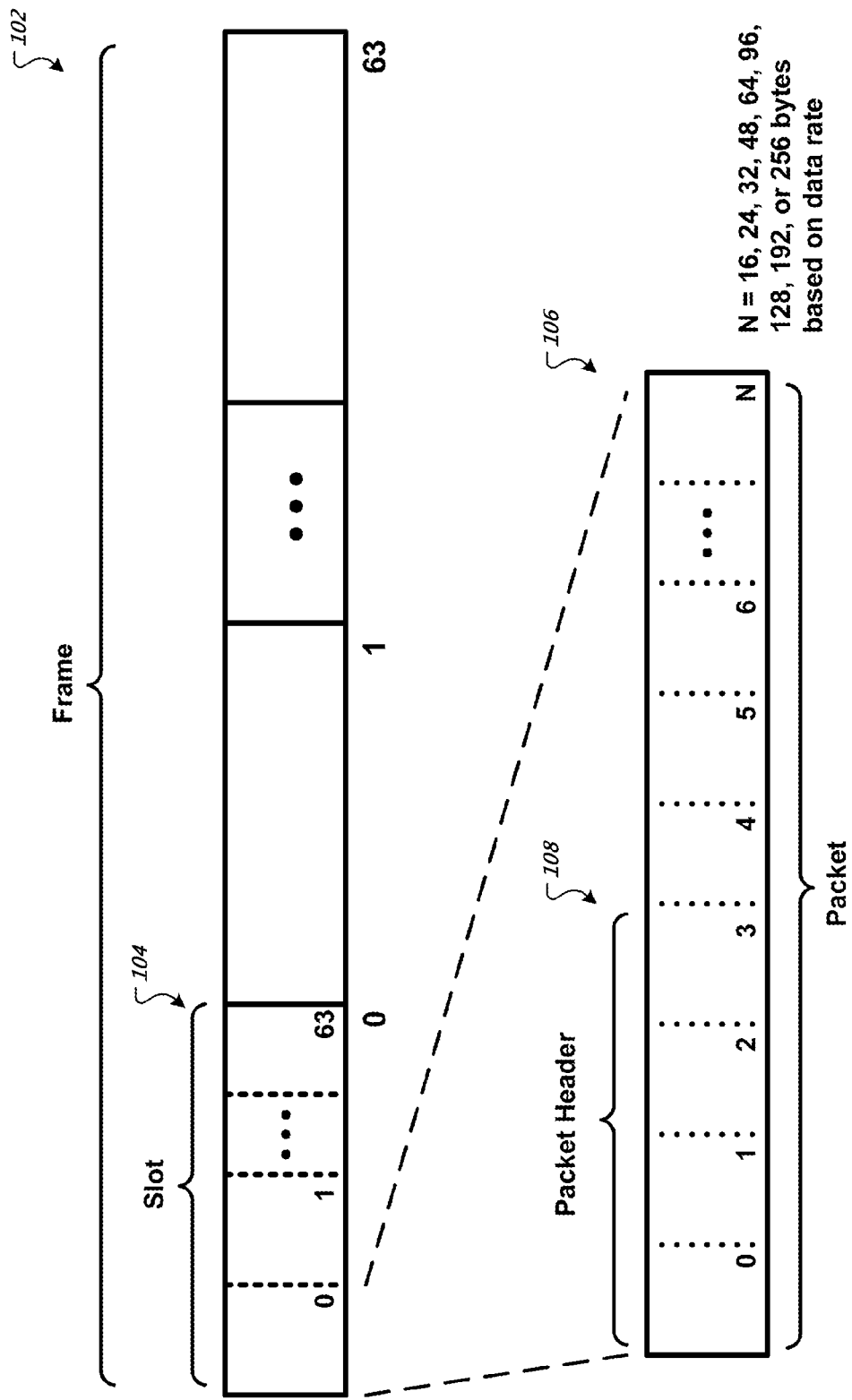
FIG. 1 shows structures for transmitting data in a communication system.

This document generally describes techniques for generating and using transmission schedules in the context of a wireless data network. Computing devices such as mobile telephones may access Internet and telecommunication services by wirelessly communicating with a network of base stations. A computing device may transmit data to, and receive data from, a single base station, for example, a base station that is closest to the computing device. Because a base station may serve more computing devices than a number of antennas at the base station, the wireless communication system may employ time division multiple access, so that particular devices are handled in turn during particular time periods (though others may be addressed simultaneously by using separate antennae).

In time division multiple access, each wireless computing device is assigned a portion of a frame (i.e., a repeating period of time) during which the computing device is allowed to receive data, and a different portion of the frame during which the computing device is allowed to transmit data. The portions of each frame during which each computing device is allowed to transmit and receive data can be defined by a schedule that the base station sends to each computing device.

The base station may compute the schedules based, at least in part, on a quantity of data that each of the computing devices has queued for transmission. As an illustration, consider a situation in which a first computing device has queued up a large media file to transmit over the Internet by way of the base station and a second computing device has queued up a text email file for transmission over the Internet by way of the base station. In this example, the first and second computing devices may transmit, to the base station, an indication of the amount of data that each device has stored in its respective queue. The base station may generate schedules based on the received indications of queue size so that the first device is granted a larger portion of a frame during which to transmit data than the second device based on the queue for the first device storing more data for transmission.

In various examples, the schedule may also be determined based on an amount of data that a device has scheduled to download. For example, a device may request a large file from a server system, and may report to a base station, information that is indicative of the file size. Similarly, a device may begin streaming data from a server system, and may report the nominal streaming data rate that will be required through the network.

In some examples, the base station uses a weight value that has been assigned to each of the computing devices in order to compute the schedules. For example, the base station may assign a different weight value to each of the computing devices based on a prioritization of data that each device has queued to transmit, and alternatively or further based on a data rate at which each of the computing devices is transmitting data.

The weight values may be used to compute the schedules. For example, the base station may proportionally allocate the available packets in a frame to the computing devices based on each device's assigned weight value. Some of the devices, however, may not require all the packets that the base station initially allocated for their use. For example, the number of packets that have been initially allocated to a particular client device based on the particular client device's weight value may exceed a quantity of packets that the particular client device requires to empty its queue. These extra packets, collected for all devices, may be redistributed to devices that require allocation of additional packets in order to empty their queues.

Redistributing packets can include proportionally assigning the extra packets to the devices that require allocation of additional packets to empty their queues. The redistribution may be performed proportionally based on a quantity of data in the device's queues (e.g., the amount of data that would remain in the devices' queues after a transmission, based on the initial allocation, of a single frame of data).

After redistributing the initially allocated packets (e.g., by taking away initially allocated packets from those devices that do not need the packets and providing such packets to the devices that do need the packets), the base station can generate a final allocation of packets. The base station can generate a schedule for each device based on the final allocation. The schedule for each device may specify the starting packet at which each device is permitted to transmit data to the base station, and a number of packets that each device is permitted to transmit, starting at each device's starting packet.

FIG. 1 shows structures for transmitting data in a communication system. In particular, the communication system may use Time Division Multiple Access (TDMA) techniques. TDMA may allow multiple devices to share a same frequency channel by dividing the transmission and receipt of data into time slots. Each time slot includes multiple packets. A frame of time is a repeating period of time.

A single frame 102 is illustrated in FIG. 1. The frame is divided into sixty-four slots (e.g., slots 0 through 63). Each slot (e.g., slot 104) is divided into sixty-four packets. Thirty-two of the packets may be designated for up-link transmission from mobile computing devices to a base station, and thirty-two of the packets may be designated for down-link transmission from the base station to the mobile computing devices. In some examples, each packet time corresponds to a segment of time of approximately 70 milliseconds, which yields a slot time of approximately 1.08 milliseconds.

The communication system may support multiple transmission rates at the physical layer. For example, a sending computing device may transmit at 16, 24, 32, 48, 64, 96, 128, 192, and 256 bytes (or bits) per packet. For example, packet 106 may be divided into a quantity (N) of bytes based on the transmission rate. While the quantity of bytes may change, the time period of packet transmission may remain the same (e.g., approximately 17 microseconds). Each packet may include a same-sized packet header 108 (e.g., a MAC packet header), regardless of the packet length. Therefore, the effective quantity of data that is transmitted per packet may be the bytes per packet minus the header size.

For examples in which multiple devices are communicating, at least some of the multiple devices may transmit data rates that differ from those for other of the devices. For example, a first mobile device may transmit data at 64 bytes per packet, a second mobile device may transmit data at 192 bytes per packet, and a third mobile device may transmit data at 24 bytes per packet. The different data transmission rates may correspond to different channel conditions between the mobile devices and the base station.

Figure 2:
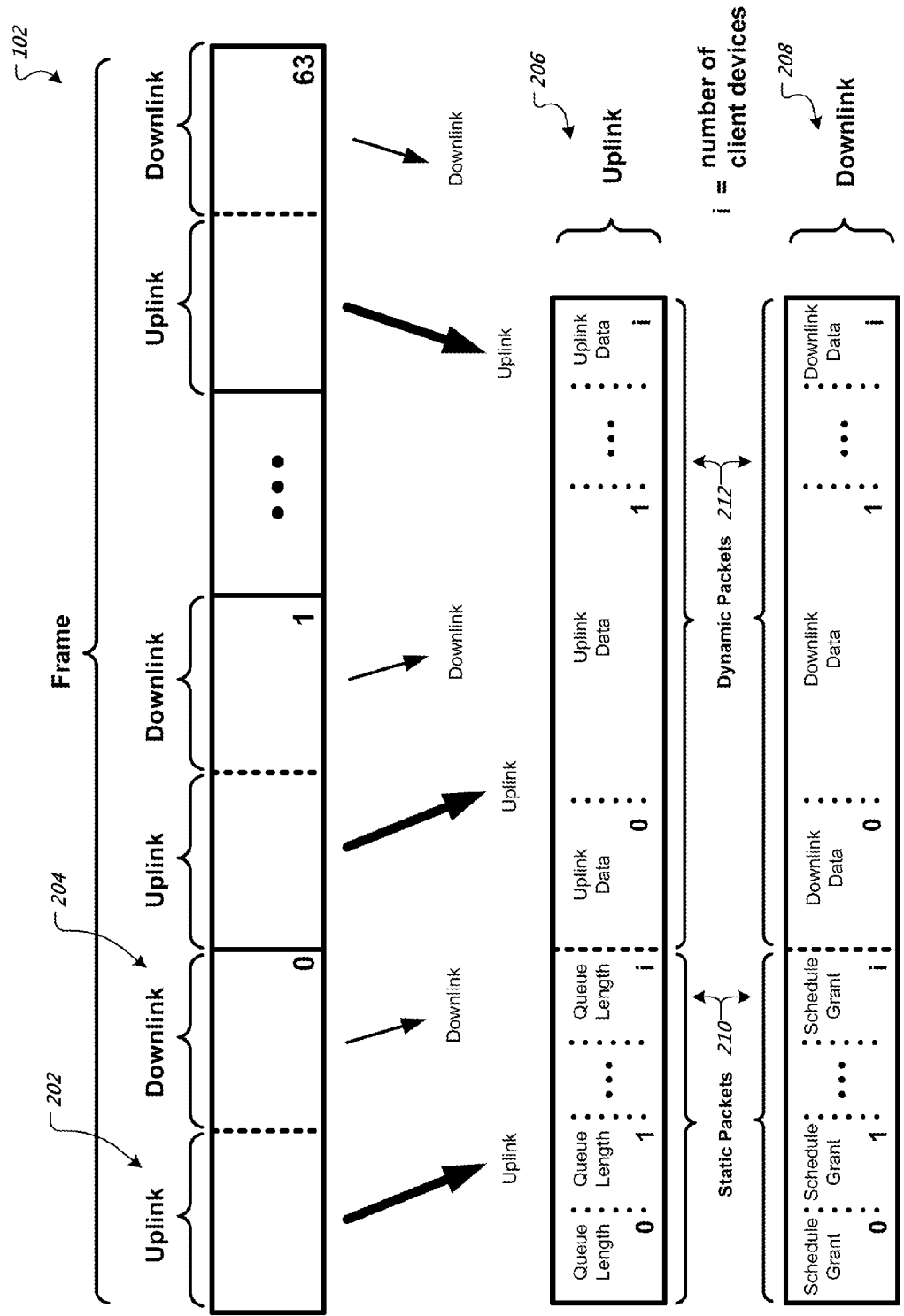
FIG. 2 shows an allocation of uplink and downlink packets among multiple client devices.

FIG. 2 shows an allocation of uplink and downlink packets among multiple client devices. As discussed with reference to FIG. 1, each of the slots in frame 102 is divided into an uplink portion 202 and a downlink portion 204. FIG. 2 shows a representation of the uplink data 206, where the uplink data 206 illustrates all of the uplink packets for frame 102 without regard for the downlink packets in the frame 102. The uplink data 206 is conceptually illustrated as a continuous block of time, but corresponds to periodic transmissions of 32 packets by the client devices in the communication system. The downlink data 208 similarly conceptually illustrates all of the downlink packets for frame 102 without regard for the uplink packets in the frame 102.

In this illustration, a beginning portion of the uplink data 206 and a beginning portion of the downlink data 208 include static packets 210. Each client device may be assigned one or more uplink static packets and one or more downlink static packets. The static packets that are assigned to a client device may not change so long as the client device remains in communication with the base station. The base station may assign different static packets to a client device should the client device leave communication with the base station, for example, by the device powering down and then back on again. To the contrary, and as discussed in more detail below, the base station may change, with every frame, the dynamic packets that are assigned to a client device. The static packets may be transmitted at a lower data rate than the dynamic packets. For example, the static packets may transmit at 16 bytes per packet while dynamic packets from the same frame may transmit at 48 bytes per packet.

The client devices may be configured so that each device transmits an indication of its respective queue length during its assigned static uplink packet. As such, the base station may be configured to receive the queue lengths from the client devices during the uplink static packets portion of the frame 102. The client devices may be configured so that each device processes a schedule grant that is received during its assigned static downlink packet. As such, the base station may be configured to transmit the schedule grants during the downlink static packets portion of the frame 102.

In some examples, the base station may assign the static packets so that the downlink static packets correspond to the uplink static packets. For example, a client device may commence communication with the base station, and the base station may assign the client device the fifth uplink static packet measured from the beginning of the frame 102 and the fifth downlink static packet measured from the beginning of the frame 102. Thus, the base station may receive data from the client device during the fifth uplink static packet, and may transmit data to the client device during the fifth downlink static packet.

The number of static packets may correspond to the number of client devices that are communicating with the base station. In some examples, the number of client devices, and thus static packets, exceeds thirty-two. As such, more than one slot may include static packets. In some examples, each client device is assigned multiple uplink static packets or multiple downlink static packets. For example, the schedule grant for each client device may occupy two packets. As such, the downlink static packets portion of the frame 102 may be twice as large as the uplink static packets portion of the frame 102.

The portion of the uplink data 206 that follows the uplink static packets includes the uplink dynamic packets. The portion of the downlink data 208 that follows the downlink static packets includes the downlink dynamic packets. The dynamic packets 212 include the substantive data that the client device transmits to the base station, and the substantive data that the base station transmits to the client device. Substantive data includes at least some data that is not used to maintain network communication between the client devices and the base station. Substantive data includes data from a higher layer of the Open Systems Interconnection model of computer networking. In some examples, substantive data includes the content of media files. Although the base station may assign each client device a same quantity of static packets (e.g., each device is assigned one uplink static packet and one downlink static packet), the base station may allocate different client devices different quantities of dynamic packets (e.g., a first device may be allocated ten uplink dynamic packets and a second device may be allocated twenty-five uplink dynamic packets).

As described in greater detail throughout this document, the base station allocates the uplink dynamic packets among the client devices, and generates, for each client device, a schedule grant that identifies the dynamic packets that are allocated to that device. The base station transmits the schedule grants to the client devices during the downlink static packets. Each schedule grant may contain data in the format "[(start slot id, frame id) count]." "Start slot id" may identify the slot in which the respective client device may begin transmitting substantive data, "frame id" may identify the frame in the identified slot in which the respective client device may begin transmitting substantive data, and "count" may identify the number of packets that the respective client device may continuously transmit substantive data, beginning at the identified slot and packet.

The schedule grants may not explicitly identify the allocated downlink dynamic packets. The downlink dynamic packet allocations, however, may correspond to the assigned uplink dynamic packet allocations. For example, a client device may receive an indication that its allocated uplink dynamic packets include the forty-fifth through fifty-second uplink packets. As such, the client device may transmit data during the forty-fifth through fifty-second uplink packets and may receive data during the forty-fifth through fifty-second downlink packets, without receiving an explicit schedule grant from the base station that identifies the downlink packet allocation. Client device inferential determination of assigned downlink packet allocation, based on the uplink packet allocation that is explicitly identified by the schedule grant, can reduce the amount of static packets that are transmitted in a frame, and thus can maximize the proportion of the frame that includes dynamic packets.

Figure 3:
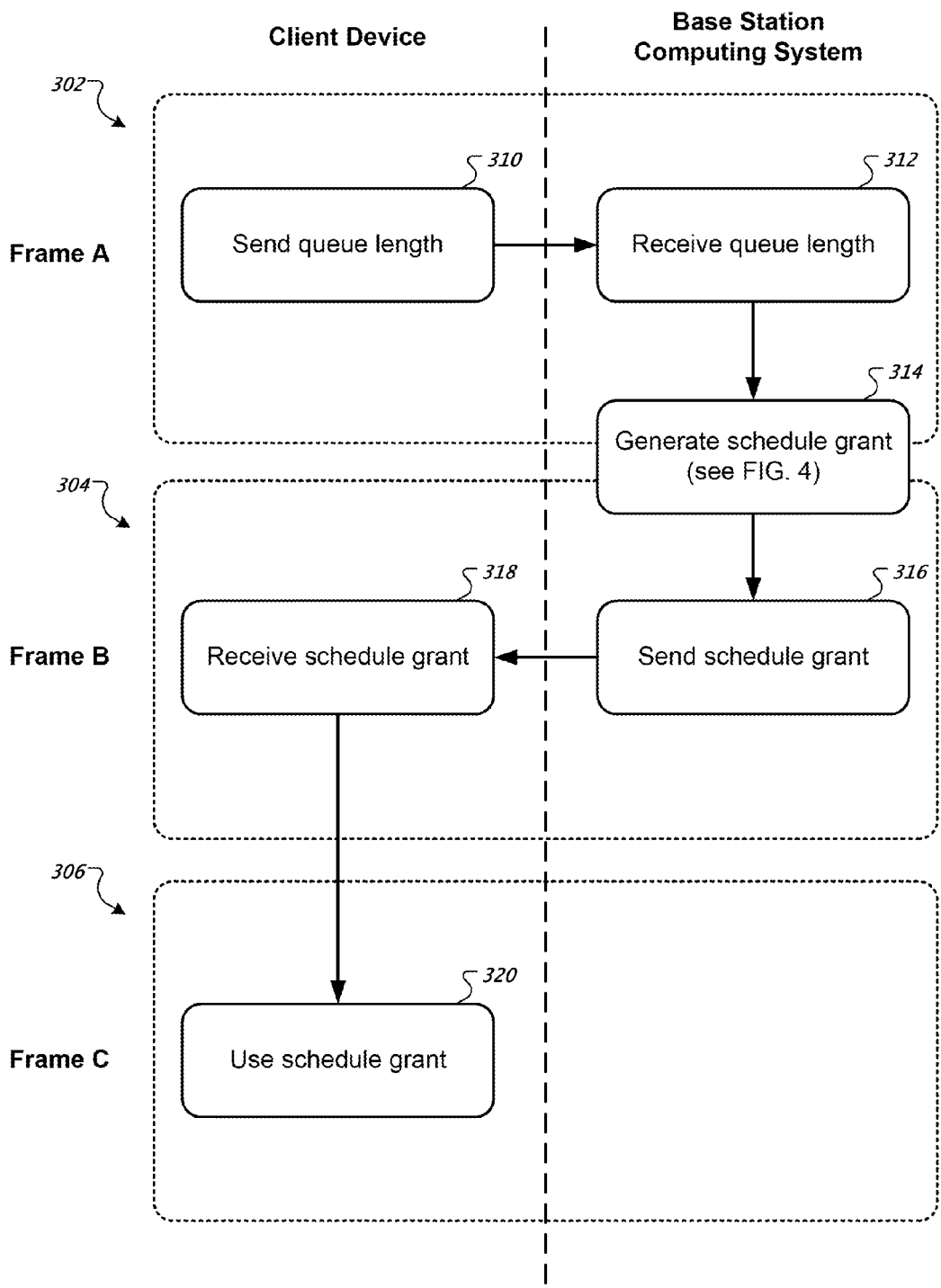
FIG. 3 shows a diagram that illustrates a process for generating and using schedule grants.

FIG. 3 shows a swim lane diagram that illustrates a process for generating and using schedule grants. In box 310, a client device sends a queue length during Frame A 302 for receipt by the base station. For example, the client device may transmit the queue length in the uplink static packet that has been assigned to the client device (e.g., during the time period that corresponds to the uplink static packet that has been assigned to the client device).

In box 312, the base station receives the queue length during Frame A 302. The base station may store the queue length in a repository with other queue lengths that were received during Frame A 302 and that represent the most recent queue lengths transmitted by the other client devices in communication with the base station.

In box 314, the base station generates a schedule grant for the client device using the queue lengths that were received for all the client devices. In some examples, the base station generates schedule grants for each of the client devices. The base station may generate the schedule grants during Frame A 302, during Frame B 304, or during both Frame A 302 and Frame B 304. The process for generating the schedule grants is described with further detail throughout this document, for example, with reference to FIG. 4.

In box 316, the base station sends the generated schedule grant to the client device during Frame B 304. For example, the base station may transmit, in the downlink static packet that is assigned to the client device, data that identifies the portion of the frame during which the client device is authorized to transmit substantive data to the base station in a subsequent frame. In some examples, the base station sends schedule grants for all of the client devices in the downlink static packets of Frame B 304.

In box 318, the client device receives the schedule grant from the base station during Frame B 304. For example, the client device may receive the schedule grant in a downlink static packet that is assigned to the client device.

In box 320, the client device uses the schedule grant. For example, the client device transmits data, from the client device's queue, during packets of Frame C 306 that are identified by the most-recently received schedule grant (i.e., the schedule grant that the client device received in Frame B 304).

In this illustration, the schedule grant that the client device uses is based on the queue length that the client device sent to the base station two frames earlier. As such, there is approximately a two-frame (e.g., at least 70 millisecond) delay between when client devices transmit queue lengths to the base station, and when the client devices begin to use schedule grants that are based, at least in part, on the content of the queue lengths. As such, the base station may be configured to implement a schedule grant, at the base station, the frame after the base station transmits the schedule grant to the client device.

FIG. 3 illustrates a single process for generating and using a schedule grant. Client devices, however, may continuously transmit their queue lengths and change the portion of packets during which the client devices transmit data. For example, a client device may transmit its queue length every packet, and may receive a schedule grant with every packet. As such, the transmitted queue length and schedule grants may change with every packet.

Figure 4:
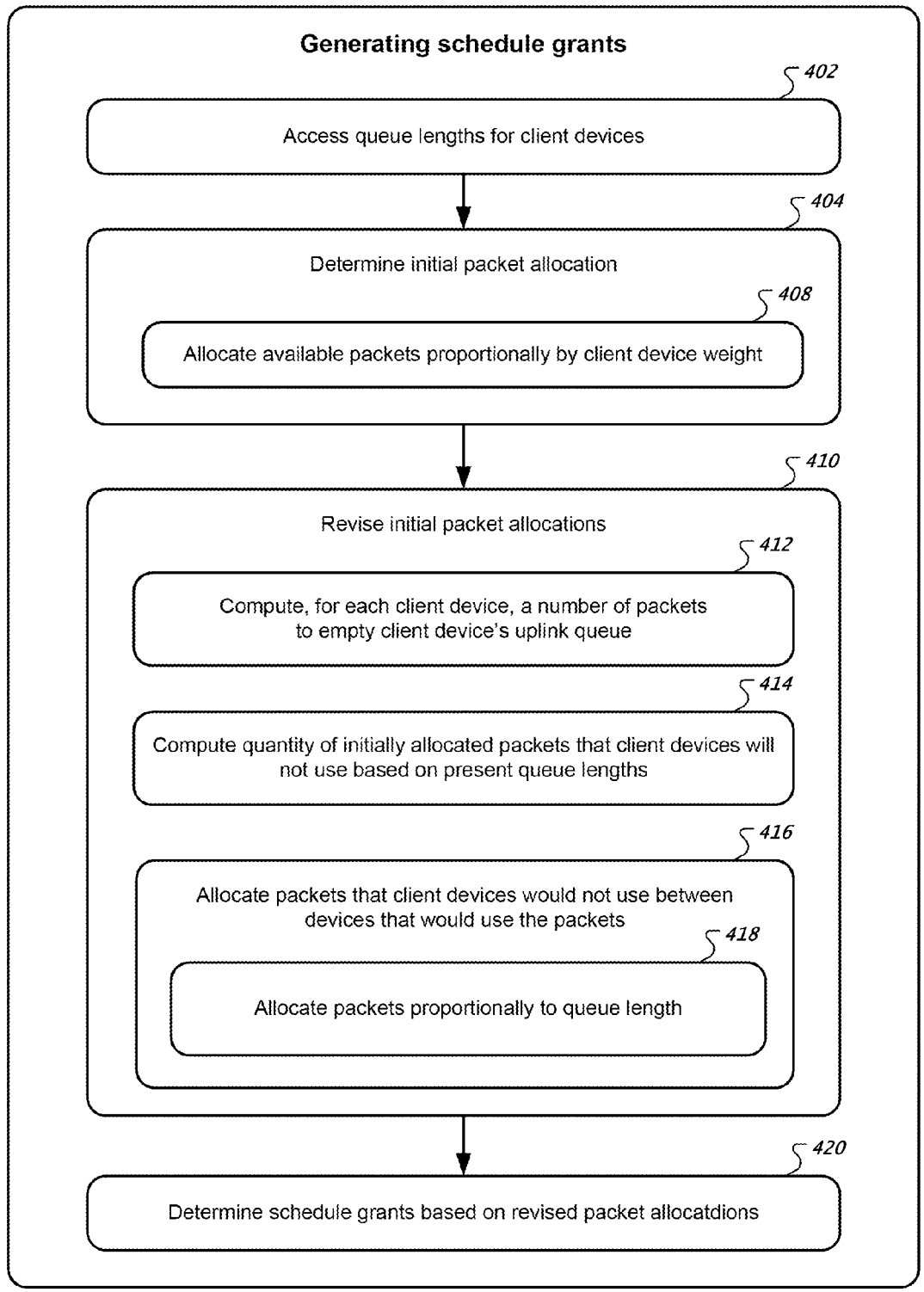
FIG. 4 shows a flowchart of an example process for generating schedule grants.

FIG. 4 shows a flowchart of an example process for generating schedule grants. In some examples, the process described with respect to the flowchart of FIG. 4 describes the operations of box 314 (FIG. 3) in further detail.

In box 402, a computing system (e.g., a computing system that is in communication with base station transmitting antennas) accesses queue lengths for client devices. For example, the computing system may access a repository that stores the queue lengths. The computing system may have previously stored the queue lengths in the repository in response to the computing system receiving the queue lengths in static uplink packets that were transmitted by client devices (e.g., in data that was transmitted during a portion of time that corresponded to the static uplink packets).

In box 404, the computing system determines an initial packet allocation. For example, the computing system may determine and reserve, as available packets, a quantity of packets in a frame that are dynamic packets. The available packets may include at least some of the packets in a frame that are not header packets and that are not static packets. The computing system may allocate the available packets among the client devices that are in communication with the base station (e.g., the client devices to which the computing system may transmit in the next frame). Devices currently in communication with the base station may include devices that already have open sessions with the base station, in addition to a determined number of future devices for which space may be reserved. In some examples, the computing system allocates the available packets by equally dividing the available packets among the client devices that are in communication with the base station. Equally dividing the packets among the client devices may include allocating an even quantity of the available packets among the client devices so that a remainder of less than the quantity of client devices remains. The remainder may be split among a subset of the client devices so that each of the subset of client devices is allocated one additional packet.

In box 408, the computing system allocates the available packets proportionally among the client devices based on weights assigned to the client devices. The allocation based on weights may be in alternative to the equal allocation that is described above. Each client device may be associated with a weight value. In some examples, the weight value for each client device is determined based, at least in part, on the respective client device's rate of data transmission. If the client device is transmitting at a high data rate, the client device may be associated with a greater weight value than a client device that is transmitting at a low data rate. A first client device that is associated with a greater weight value than a second client device is allocated a greater amount of the available packets than the second client device based on the difference in weight value.

The weights may be previously selected based on an allocation profile that is independent of the actual demand from any client, and then rates may be assigned to particular devices so as to match the profile. For example, a profile for four devices may allocate 40%, 30%, 20%, and 10% of capacity to the respective devices, and the device ultimately determined to have the highest demand may receive the 40% allocation, even if the device's demand is actually higher or lower than 40% of the total demand.

In some examples, the weight value for each client device is based, at least in part, on a priority of data that the client device is transmitting or has transmitted. For example, the computing system may assign the client device a greater weight value if the client device has been transmitting a significant amount of time-sensitive data (e.g., data encoding audio from a telephone call) than if the client device has been not been transmitting a significant amount of time-sensitive data.

The computing system may proportionally allocate the available packets among the client devices based on weight value. Proportionally allocating the packets based on weight value may include allocating the packets among the client devices as near as possible using whole numbers so that a remainder of less than the quantity of client devices remains. The remainder may be split among a subset of the client devices so that each of the subset of client devices is allocated one additional packet.

An example formula for computing an initial packet allocation is:

$$\text{allocated\_packets}(i) = \text{available\_packets} * \left( \frac{\text{weight}(i)}{\sum_{j=1}^{n} \text{weight}(j)} \right)$$

In this example, the base station is communicating with "n" client devices, and the packets that are allocated for device "i" include the quantity of available packets multiplied by the weight that is associated with device "i" divided by the sum of the weights that are associated with all the client devices.

In box 410, the computing system revises the initial packet allocations. The computing system may revise the initial packet allocations because some of the client devices may not require all of the packets that the computing system initially allocated to the client devices.

In box 412, the computing system computes, for each client device, a number of packets to empty each client device's uplink queue. For example, the computing system may divide the number of bytes in a client device's uplink queue by the maximum number of bytes from the queue that the client device can transmit in a packet. The maximum number of bytes from the queue that the client device can transmit in a packet is based on the number of bytes per packet at which the client device is transmitting minus the number of bytes in the header of each packet. The computing system may round up non-whole numbers of packets resulting from the division. An example formula used in computing a maximum number of packets to empty a client device's queue is:

$$\text{packets\_to\_empty\_queue}(i) = \frac{\text{uplink\_queue\_length}(i)}{\text{uplink\_data\_rate}(i) - \text{packet\_overhead}}$$

In examples where the downlink dynamic packet allocation mirrors the uplink dynamic packet allocation, the computed maximum number of packets to empty the queue may include taking a maximum value of either the maximum number of packets to empty the uplink queue or a maximum number of packets to empty the downlink queue. Computing the maximum number of packets to empty the downlink queue may be computed similarly to the maximum number of packets to empty the downlink queue.

In box 414, the computing system computes a quantity of the initially allocated packets that the client devices will not use based on present queue lengths. For example, the computing system may have initially allocated some of the client devices more packets than such client devices' "packets_to_empty_queue." An example formula for computing the quantity of these extra packets is:

$$\text{extra\_packets} \mathrel{+}= \sum_{j=1}^{n} \max(0, \text{allocated\_packets}(j) - \text{packets\_to\_empty\_queue}(j))$$

In box 416, the computing system allocates the packets that client devices would not use between devices that would use the packets. For example, the computing system may split the "extra_packets" between those computing devices where "packets_to_empty_queue(i)−allocated_packets(i)" is greater than 0.

In box 418, the computing system proportionally allocates the packets that the client devices would not use between devices that would use the packets based on the queue length of the devices that would use the packets. For example, the computing system may identify the excess queue length that some of the client devices would not be able transmit, based on a transmission of a single frame using the initial allocation. The computing system may proportionally divide the "extra_packets" among those client devices with an excess queue length based on the excess queue lengths. An example formula for proportionally dividing the "extra_packets," for each client device with "packets_to_empty_queue(i)−allocated_packets(i)">0, is:

$$\text{allocated\_packets}(i) \mathrel{+}= \text{extra\_packets} * \frac{\text{packets\_to\_empty\_queue}(i) - \text{allocated\_packets}(i)}{\sum_{j=1}^{n} \text{packets\_to\_empty\_queue}(j) - \text{allocated\_packets}(j)}$$

As described above with reference to box 408, proportional allocation may include substantially proportionally allocating packets so that no client device is allocated more than one packet (or more than two packets in some examples) away from a precise proportional allocation that includes portions of packets. The resulting value for "allocated_packets(i)" for each of the client devices is a final allocation of dynamic packets.

In box 420, the computing system determines the schedule grants for the client devices. For example, although the computing system may have determined a final packet allocation that identifies a quantity of packets to allocate to the devices, the computing system may further determine a grouping of the allocated packets. The packets that are allocated to each client device may be allocated for contiguous use by the client device (i.e., the client device may transmit data during contiguous segments of time represented by the packets). Contiguous allocation may include allocating a contiguous block of uplink packets even though the middle of the contiguous uplink packets are interrupted by a downlink portion of a slot.

In some examples, determining schedule grants includes determining an ordering of the groups of packets. In other words, the computing system needs to determine which computing device can transmit dynamic packets first in a frame, which computing device can transmit dynamic packets second in a frame, and so forth. The computing system may make such a determination based, in part, on a conservation value that is associated with each client device.

The conservation values may have been generated, by the computing system or another computerized device or collection of devices, for each client device based on power efficiency settings of the respective client device. For example, a client device that requests minimal power usage may be associated with a greater conservation value, while a client device that has not requested minimal power usage may not be associated with a greater conservation value. The computing system may allocate packets for devices with greater conservation values closer to the static values (e.g., closer to the start of the frame) than devices without greater conservation values. As such, computing systems with greater conservation values may turn off or reduce power to their radios for an extended period of time, reducing client device energy usage.

In some examples, determining schedule grants includes determining whether the schedule grant for a client device should be a repeating schedule grant or a static schedule grant. The computing system may generate repeating schedule grants for devices that the computing system determines have been transmitting a predictable and steady level of data. A repeating schedule grant may include an indication that the schedule grant is repeating, for example, a number that indicates a number of frames for which the repeating schedule grant is active. The computing system may decrement the number with every frame. A repeating schedule grant may be beneficial because, if a client device does not receive a schedule grant (e.g., because of interference), the client device may still be able to transmit during an uplink portion of the frame if the repeating schedule is still active. The client device may further be able to receive data during the corresponding portion of the downlink portion of the frame.

Figure 5:
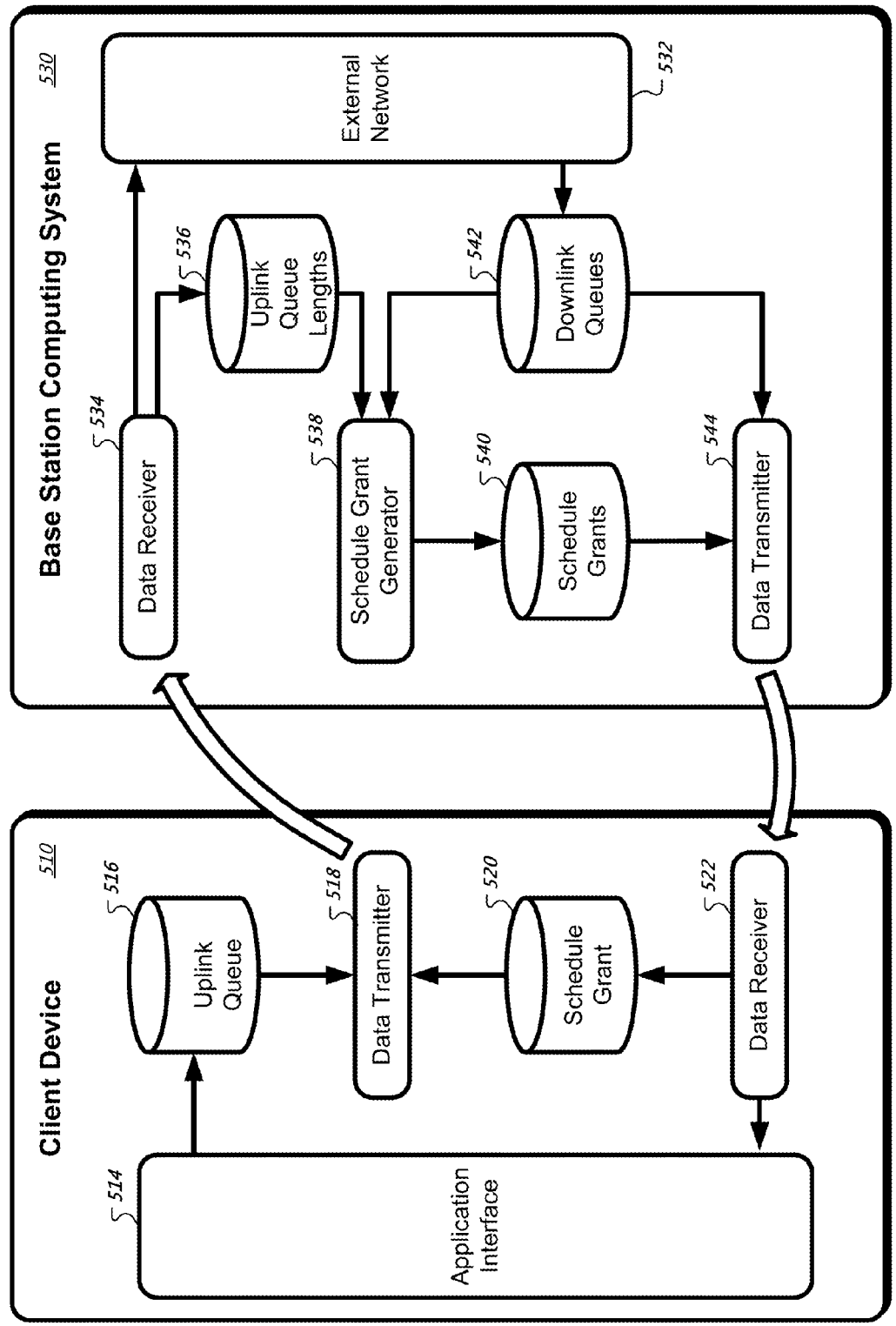
FIG. 5 shows a system for generating and using schedule grants.

FIG. 5 shows a system for generating and using schedule grants. The system includes a client device 510 and a base station computing system 530. The base station data transmitter 544 transmits data, from one of multiple downlink queues 542, to the client device data receiver 522. The base station transmits downlink packets of a frame (i.e., the base station computing system transmits the data during portions of time that correspond to downlink packets of a frame). The client device data receiver 522 receives a schedule grant 520 during a static packet of a frame. The client device data transmitter 518 transmits data, from uplink queue 516 in uplink packets of a frame, to the base station data receiver 534. The client device data transmitter 518 transmits the data in portions of the frame that are assigned to the client device 510 by the schedule grant 520.

In some examples, the system that is shown in FIG. 5 may perform the operations that are described with reference to the flowcharts of FIGS. 3 and 4. The system of FIG. 5 shows a single client device 510 for illustrative purposes, although multiple similar client devices may transmit data to the base station computing system 530 during a frame.

In further detail, the base station computing system 530 may queue, in one of multiple downlink queues 542, data that is designated for receipt by the client device 510. The data may be designated for receipt by the client device in response to the client requesting the data. For example, the client device may have previously transmitted to the base station computing system 530 an HTTP request for a web page. The base station computing system 530 may transmit the request over an external network 532, may receive in response to the request HTTP response data, and may store the HTTP response data in the downlink queue for transmission to the client device 510.

The base station computing system 530 may transmit, in downlink portions of a frame, bytes of data that are intended for receipt by different computing devices. For example, a portion of the frame may include data for a client device 510, and another portion of the frame may include data for another client device (not shown). Schedule grants 540 may identify the portions of the frame that correspond to each client device. Generating the schedule grants 540 is discussed in greater detail throughout this document. The schedule grants 540 may be transmitted during static packets of the frame, as discussed in greater detail throughout this document.

As an illustration, the computing system 530 may retrieve a schedule grant 540 for a first client device 510 and a schedule grant for a second client device (not shown), and place the retrieved schedule grants 540 in the static downlink slots that correspond to the first and second client devices, respectively. The computing system 530 may transmit data, from a downlink queue that corresponds to a first client device, during a downlink part of the frame that corresponds to the first client device. The computing system may transmit data, from a downlink queue that corresponds to a second client device, during a downlink part of the frame that corresponds to the second client device.

The client device data receiver 522 may receive data that is transmitted during a portion of the frame that has been allocated to the client device, as identified based on a previously received schedule grant 520. The client device data receiver 522 may forward data that was received during the client device's allocated dynamic packets portion of the frame to the application interface 514. The application interface 514 may provide data to a higher OSI layer, and may receive data from the higher OSI layer. Also, the client device data receiver 522 may retrieve, from a static downlink packet in the frame, a schedule grant 520. The schedule grant 520 may identify a schedule grant for the client device 510 for at least the next frame.

The uplink queue 516 may store data that the application interface 514 has provided for transmission to the base station computing system 530 (e.g., where at least some of the data is for transmission over the external network 532). The data may be stored temporarily by the client device 510 until the data, or a portion of the data, can be transmitted in one or more packets to the base station computing system 530.

The data transmitter 518 transmits every frame, within a static uplink packet that is assigned to the client device 510, an indication of a size of the uplink queue. The transmitted indication of the size of the uplink queue may identify, for example, a size of the queue in bytes, a size of the queue in "packets to empty the queue," or another designation of queue size. The client device data transmitter 518 further transmits, during the dynamic uplink packets that have been allocated to the client device, data from the uplink queue 516. The dynamic uplink packets that are designated for use by the client device 510 are identified by the schedule grant 520. The client device may repeatedly use the schedule grant 520 that was received during the most-recently received frame.

The base station data receiver 534 may receive a frame of data (e.g., data that was transmitted during time that corresponds to the frame), forward the data from the dynamic packets of the frame to a higher OSI layer, and extract the uplink queue lengths 536 from the static packets of the frame.

The schedule grant generator 538 may generate schedule grants based on the uplink queue lengths 536 and based on the data in the downlink queues 542 (e.g., the downlink queue lengths), as described throughout this document, for example, with reference to FIG. 4. For example, the schedule grant generator 538 may assign an initial quantity of packets to each of the client devices, for example, based on a weight value that is assigned to each client device. The schedule grant generator 538 may then adjust this initial quantity of packets so that client devices that do not need the entire amount of the initial quantity of packets are only allocated the amount of packets that they need. The extra packets are proportionally allocated to the other devices based on sizes of the other device's queues.

The schedule grants 540 may then be transmitted to the client devices by the base station data transmitter 544. The schedule grant generator 538 may separately generate uplink schedule grants, or may handle the uplink and downlink portions of a frame symmetrically. For example, if the 32nd through 47th uplink bytes are granted to a particular client device, the 32nd through 47th downlink bytes may also be granted to the particular client device. Uplink queues, in some examples, may not be transmitted to the client device 510.

Figure 6:
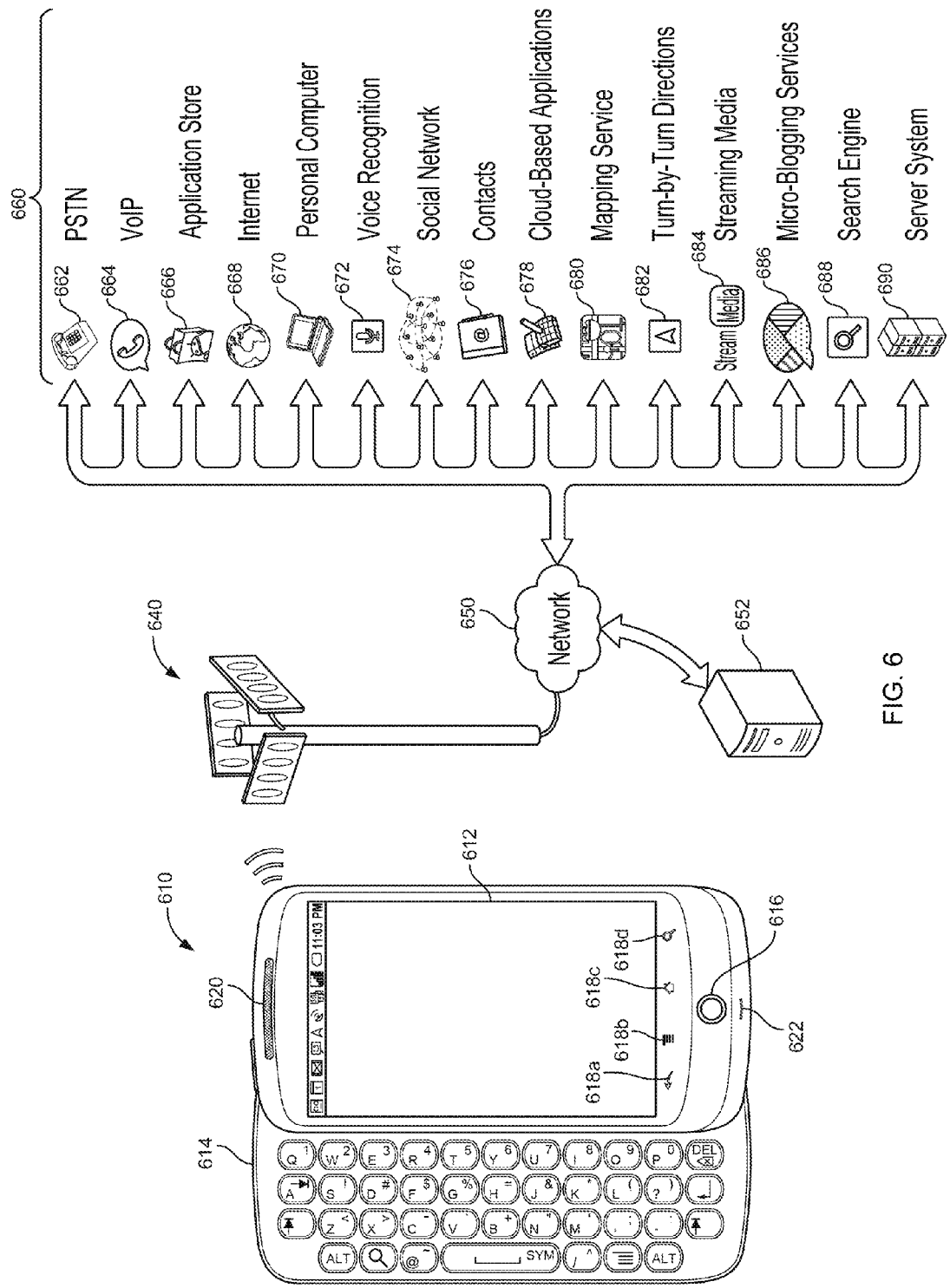
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch input locations with the displayed information so that user contact above a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user with the capability to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the Internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the Internet 668 through network 650. For example, a user of the mobile computing device 610 may invoke a web browser application that requests data from remote computing devices that are accessible at designated universal resource locations. In various examples, some of the services 660 are accessible over the Internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
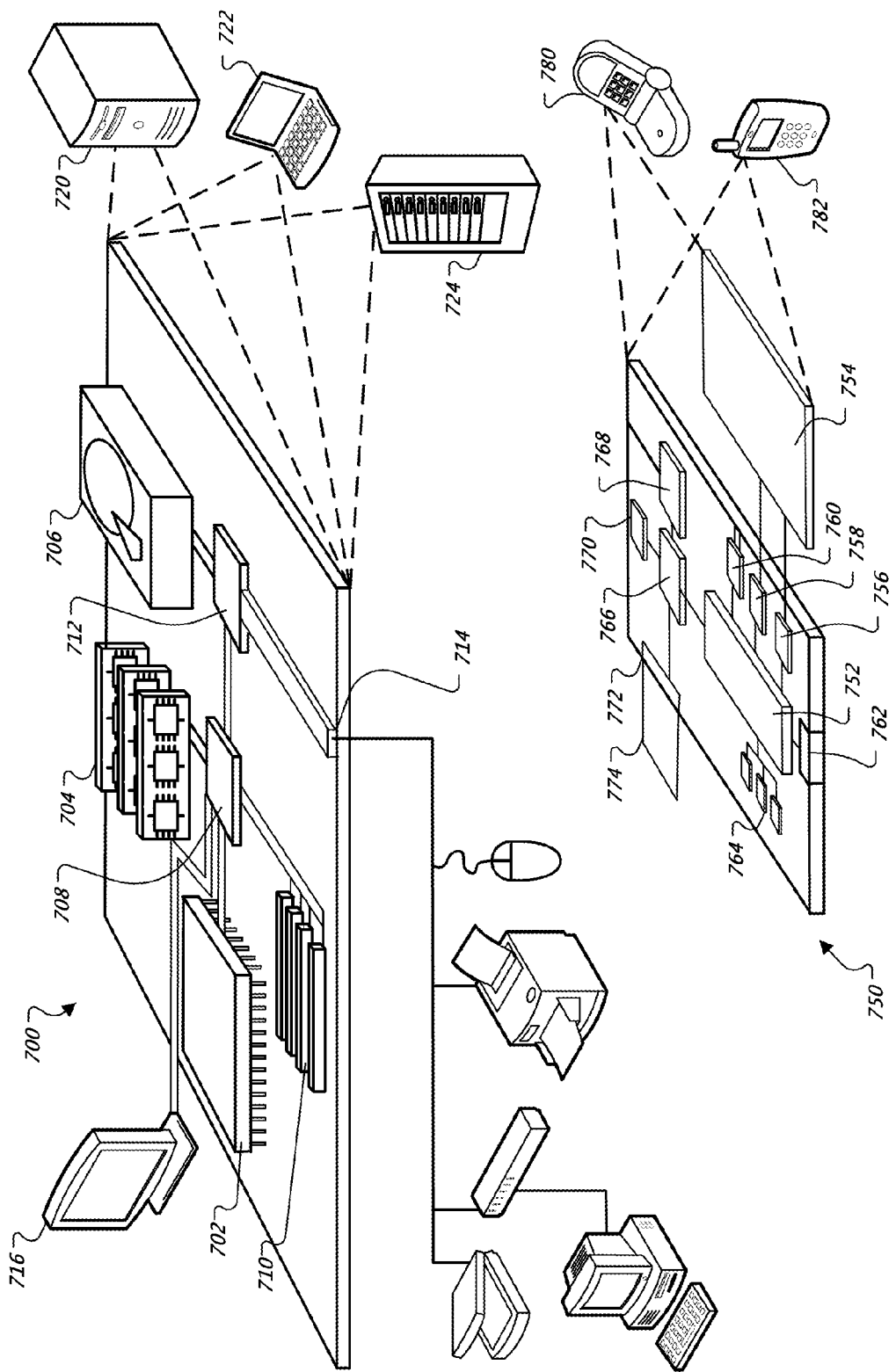
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims

What is claimed is:

1. A computer-implemented method for generating a schedule to transmit data on a network, the method comprising:

receiving, by a computing system and for each particular client device of multiple client devices from a plurality of client devices with which the computing system is communicating in a network, first information that identifies a first quantity of data that the particular client device has designated for transmission to the computing system;

identifying, by the computing system, an initial allocation of packet time segments, from a frame that includes packet time segments, among the multiple client devices;

determining, by the computing system, as available packet time segments, those packet time segments of the initially-allocated packet time segments that one or more of the multiple client devices would not use in order for each of the one or more of the multiple client devices to transmit the data that the respective client device has designated for transmission to the computing system;

allocating, by the computing system, the available packet time segments among a subset of the multiple client devices proportionally based on a quantity of data that each of the subset of client devices has designated for transmission to the computing system, in order to generate a final allocation of packet time segments among the multiple client devices, the subset of the multiple client devices being those client devices of the multiple client devices that are not the one or more client devices, wherein at least two of the multiple client devices are dynamically allocated different quantities of packet time segments in the final allocation of packet time segments, during which the at least two of the multiple client devices are permitted to transmit data to the computing system; and transmitting, by the computing system and for receipt by each particular client device of the multiple client devices, a first schedule that identifies a first subset of packet time segments from the frame during which the particular client device is permitted to transmit data to the computing system, the first subset of packet time segments for each particular client device being identified from the final allocation of packet time segments;

accessing, by the computing system and for each particular client device of the multiple client devices, second information that identifies a second quantity of data that the particular client device has designated for transmission to the computing system; and determining, by the computing system and using the second information that identifies the second quantity of data for each of the multiple client devices, a second schedule that identifies a second subset of packet time segments, from the frame, during which a first client device is permitted to transmit data to the computing system, wherein the first subset of packet time segments for the first client device is different than the second subset of packet time segments.

2. A computer-implemented method for generating a schedule to transmit data on a network, the method comprising:

accessing, by a computing system and for each particular client device of multiple client devices from a plurality of client devices with which the computing system is communicating in a network, first information that identifies a first quantity of data that the particular client device has designated for transmission to the computing system;

determining, by the computing system and using the first information that identifies the first quantity of data for each of the multiple client devices, a first schedule that identifies a first subset of packet time segments, from a frame that includes packet time segments, during which a first client device is permitted to transmit data to the computing system, the first client device being one of the multiple client devices, wherein at least two of the multiple client devices are dynamically allocated different quantities of packet time segments during which the at least two of the multiple client devices are permitted to transmit data to the computing system;

transmitting, by the computing system, the first schedule for receipt by the first client device;

receiving, by the computing system, a transmission of data from the first client device during the identified first subset of packet time segments in accordance with the first schedule;

accessing, by the computing system and for each particular client device of the multiple client devices, second information that identifies a second quantity of data that the particular client device has designated for transmission to the computing system; and determining, by the computing system and using the second information that identifies the second quantity of data for each of the multiple client devices, a second schedule that identifies a second subset of packet time segments, from the frame, during which the first client device is permitted to transmit data to the computing system, wherein the first subset of packet time segments is different than the second subset of packet time segments.

3. The computer-implemented method of claim 2, further comprising:

receiving, by the computing system and from each particular client device of the multiple client devices, a transmission of data from the particular client device that includes the first information that identifies the first quantity of data that the particular client device has designated for transmission to the computing system.

4. The computer-implemented method of claim 2, wherein the first information that identifies the first quantity of data is a quantity of bytes or bits that the particular client device has designated for transmission to the computing system.

5. The computer-implemented method of claim 2, wherein the first information that identifies the first quantity of data is a quantity of packets that the particular client device would use to transmit, to the computing system, the data that the particular client device has designated for transmission to the computing system.

6. The computer-implemented method of claim 2, wherein determining the first schedule includes proportionally allocating at least some of the packet time segments from the frame among at least some of the client devices, the proportional allocation of the at least some packet time segments being based on the first quantity of data that each of the at least some client devices have designated for transmission to the computing system.

7. The computer-implemented method of claim 2, wherein determining the first schedule includes:

identifying, by the computing system, an initial allocation of the packet time segments among the multiple client devices;

determining, by the computing system, as available packet time segments, those packet time segments of the initially-allocated packet time segments that one or more of the client devices would not use in order for each of the one or more of the client devices to transmit the data that the respective client device has designated for transmission to the computing system; and allocating, by the computing system, the available packet time segments among a subset of the client devices including those client devices of the multiple client devices that are not the one or more client devices.

8. The computer-implemented method of claim 7, wherein the available packet time segments are proportionally allocated among the subset of the client devices based on a weight value that has been assigned to each of the subset of client devices, the weight value being different between at least two of the subset of client devices.

9. The computer-implemented method of claim 7, wherein the available packet time segments are proportionally allocated among the subset of the client devices based on an amount of data that each of the subset of client devices has designated for transmission to the computing system.

10. The computer-implemented method of claim 7, wherein the available packet time segments are proportionally allocated among the subset of client devices proportionally based on an amount of data that each of the subset of client devices would not be able to transmit in a single frame using the initial allocation of packet time segments.

11. The computer-implemented method of claim 7, further comprising determining the initial allocation of the packet time segments by allocating an equal amount of the packet time segments in the frame to each of the multiple client devices.

12. The computer-implemented method of claim 7, further comprising determining the initial allocation of the packet time segments by allocating the packet time segments in the frame proportionally among the multiple client devices according to a weight value for each of the multiple client devices, wherein the weight value for each particular client device of the multiple client devices is based, at least in part, on a priority value of data that the particular client device has designated for transmission to the computing system, the priority value identifying a degree of time-criticality of the data that the particular client device has designated for transmission to the computing system.

13. The computer-implemented method of claim 7, further comprising determining the initial allocation of the packet time segments by proportionally allocating the packet time segments in the frame among the multiple client devices according to a weight value, wherein the weight value for each particular client device of the multiple client devices is based, at least in part, on a data rate at which the particular client device is transmitting data to the computing system, the data rate being different between at least two of the multiple client devices.

14. The computer-implemented method of claim 13, wherein the computing system initially allocates more packet time segments to a first client device of the multiple client devices than a second client device of the multiple client devices based on the first client device being associated with a greater weight value than a weight value of the second client device, the first client device having a greater weight value than the second client device based on the first client device transmitting at a higher data rate than the second client device.

15. The computer-implemented method of claim 2, wherein:

the computing system transmits the first schedule to the first client device during a first frame that includes packet time segments;

during the first frame, the first client device does not transmit data in accordance with the first schedule; and the received transmission of data from the first client device occurs during a second frame that is subsequent to the first frame.

16. The computer-implemented method of claim 2, wherein the first subset of packet time segments are a set of contiguous packet time segments in the frame.

17. The computer-implemented method of claim 16, further comprising determining a position of the first subset of packet time segments in the frame, with respect to other subsets of packet time segments for other of the multiple client devices, based a conservation value that is associated with each of the client devices, wherein the conservation value for each of at least some of the client devices indicates a power efficiency setting that is associated with the respective client device.

18. The computer-implemented method of claim 2, wherein determining the first schedule includes proportionally allocating the packet time segments among the multiple client devices based on a weight value that has been assigned to each of the multiple client devices, the weight value being different between the at least two of the multiple of client devices.

19. The computer-implemented method of claim 2, further comprising:
   transmitting, by the computing system, the second schedule for receipt by the first client device; and
   receiving, by the computing system, a second transmission of data from the first client device during the identified second subset of packet time segments in accordance with the second schedule.

20. A system comprising a computing system that includes:
   a data repository that stores, for each particular client device of multiple client devices, (i) first information that identifies a first quantity of data that the particular client device has designated for transmission, and (ii) second information that identifies a second quantity of data that the particular client device has designated for transmission;
   a computing sub-system that is configured to (a) use the first information that identifies the first quantity of data for each of the multiple client devices to generate a first schedule that identifies a first subset of packet time segments, from a frame of packet time segments, during which a first client device is permitted to transmit data, the first client device being one of the multiple client devices, and (b) use the second information that identifies the second quantity of data for each of the multiple client devices to generate a second schedule that identifies a second subset of packet time segments, from the frame of packet time segments, during which the first client device is permitted to transmit data, wherein the first subset of packet time segments is different than the second subset of packet time segments, wherein the computing sub-system is configured to dynamically allocate at least two of the multiple client devices different quantities of packet time segments during which the at least two of the multiple client devices are permitted to transmit data to the computing system; and
   a data transmitter that is configured to transmit the first schedule for receipt by the client device.

21. The system of claim 20, wherein the computing sub-system is further configured to proportionally allocate packet time segments, from the frame of packet time segments, among the multiple client devices based on the first information that identifies the first quantity of data for each of the multiple client devices.

22. The system of claim 20, further comprising the first client device, wherein the first client device includes a second data transmitter that is configured to:
   receive the first schedule;
   transmit, in a single frame of packet time segments and during the first subset of packet time segments that are identified by the first schedule, at least a portion of the first quantity of data that the first device designated for transmission; and
   transmit, in the single frame, an indication of a quantity of data that remains designated by the first client device for transmission after transmission by the first client device of the at least portion of the first quantity of data.

* * * * *